(12) United States Patent
Shiina

(10) Patent No.: US 10,356,328 B2
(45) Date of Patent: Jul. 16, 2019

(54) DISPLAY CONTROL APPARATUS AND DISPLAY CONTROL METHOD

(71) Applicant: CANON KABUSHIKI KAISHA, Tokyo (JP)

(72) Inventor: Maiko Shiina, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/975,838

(22) Filed: May 10, 2018

(65) Prior Publication Data

US 2018/0338080 A1  Nov. 22, 2018

(30) Foreign Application Priority Data

May 16, 2017 (JP) .................................. 2017-097512

(51) Int. Cl.
*H04N 5/232* (2006.01)
*G06F 3/0484* (2013.01)

(52) U.S. Cl.
CPC ... *H04N 5/232945* (2018.08); *G06F 3/04847* (2013.01); *H04N 5/23212* (2013.01); *H04N 5/23216* (2013.01); *H04N 5/232127* (2018.08); *H04N 5/232933* (2018.08)

(58) Field of Classification Search
CPC ......... H04N 5/23212; H04N 5/232127; H04N 5/232945; H04N 5/232933; H04N 5/232939; G06F 3/04847
See application file for complete search history.

(56) References Cited

U.S. PATENT DOCUMENTS

| | | | | |
|---|---|---|---|---|
| 6,670,992 B2* | 12/2003 | Irie | ...................... | H04N 5/2351 348/345 |
| 2009/0034954 A1* | 2/2009 | Kubota | .................. | G03B 13/36 396/121 |
| 2010/0074606 A1* | 3/2010 | Sasaki | ................ | H04N 5/23212 396/121 |
| 2013/0002884 A1* | 1/2013 | Nakagawara | ...... | H04N 5/23212 348/169 |
| 2015/0022682 A1* | 1/2015 | Seita | .................. | H04N 5/23245 348/220.1 |

FOREIGN PATENT DOCUMENTS

| | | |
|---|---|---|
| JP | 10-170813 A | 6/1998 |
| JP | 2008-233117 A | 10/2008 |

* cited by examiner

*Primary Examiner* — Daniel M Pasiewicz
(74) *Attorney, Agent, or Firm* — Cowan, Liebowitz & Latman, P.C.

(57) ABSTRACT

Provided is a display control apparatus in which a movement amount of a selection candidate to be selected, from among a plurality of positions displayed in a display screen, according to a selection operation performed by a user, is selectable. The display control apparatus also displays an indicator that indicates a currently selected position. The display control apparatus, in the case of a first movement amount being set, displays a position of the selection candidate, so as to be distinguishable from other positions. Also, the apparatus, in the case of a second movement amount of the selection candidate being set, displays a position of a selection candidate so as to be distinguishable from other positions.

18 Claims, 11 Drawing Sheets

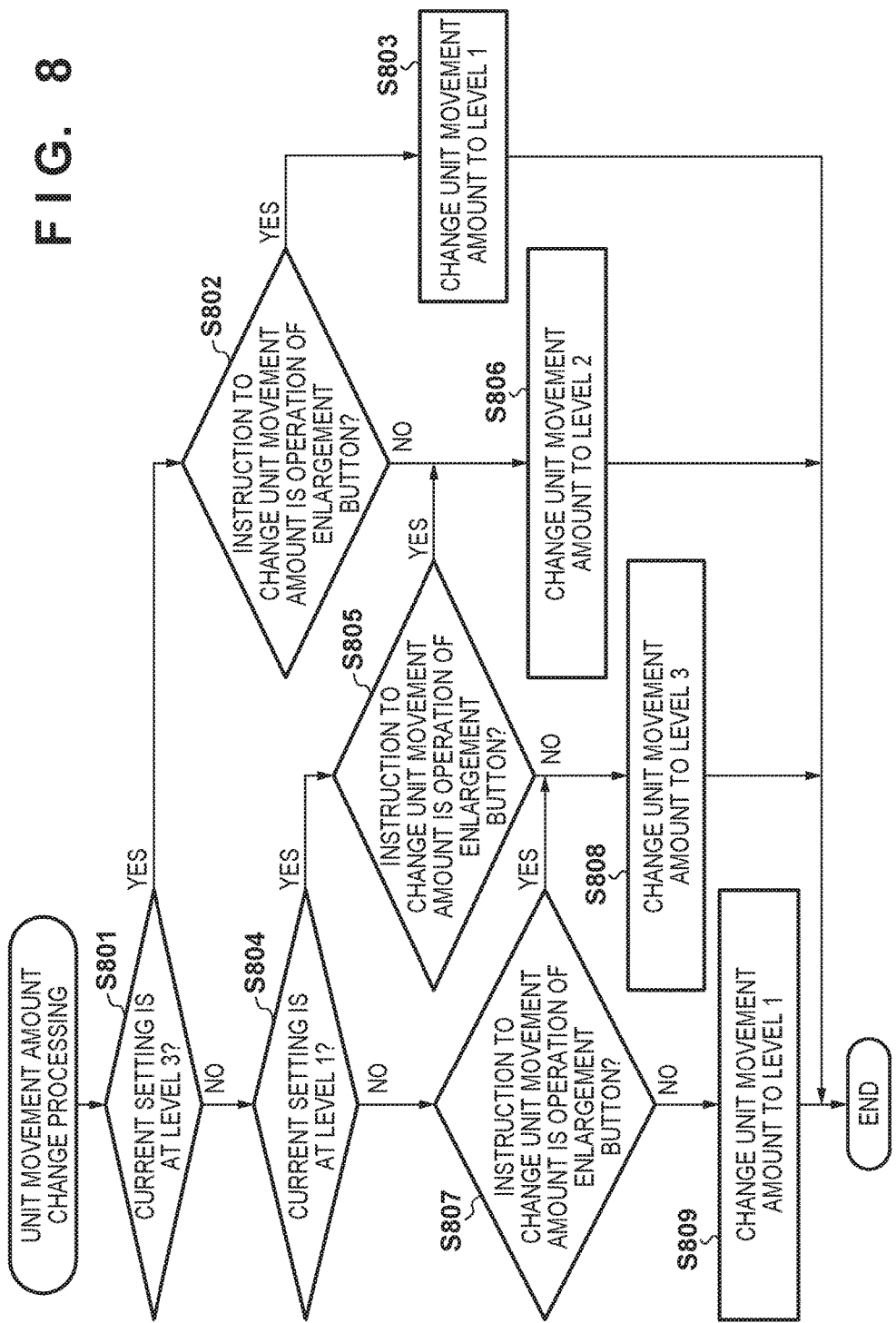

DISPLAY CONTROL APPARATUS AND DISPLAY CONTROL METHOD

BACKGROUND OF THE INVENTION

Field of the Invention

The present invention relates to display control apparatuses and display control methods, and specifically relates to a technique for indicating a position to be selected, when one of a plurality of selection candidates is selected.

Description of the Related Art

Heretofore, a user interface has been known in which one of a plurality of selection candidates can be selected by a user performing a predetermined operation. An image capture apparatus in which a user can select one of a plurality of AF frames using a cross key switch or the like is disclosed in Japanese Patent Laid-Open No. 10-170813.

In recent years, there is a trend of increasing a range in which the AF frame can be set and increasing the number of candidates of selectable AF frames, in order to precisely specify a position to be focused on. For example, there is an image capture apparatus in which one AF frame can be selected from several hundreds of candidates that are arranged over almost the entire screen. In such an image capture apparatus, the operation to change the selected AF frame position to a desired position using a cross key switch (direction key) and the like may become complicated.

For example, assume a configuration in which every time a direction key is pressed, the selected AF frame position is moved by one frame in the direction corresponding to the pressed direction key. In the case where there are a large number of selectable AF frame positions, in order to select an AF frame at a position separated from the currently selected position, the direction key needs to be operated many times. Japanese Patent Laid-Open No. 2008-233117 describes a technique in which a cursor for selecting an item is moved one by one when the direction key is operated, and is largely moved when an operation to rotate a dial is performed.

In the case where the cursor is to be moved one by one or to be moved at a greater rate every time an operation is performed depending on the performed operation, as described in Japanese Patent Laid-Open No. 2008-233117, it is possible that the user cannot grasp as to where the cursor will be moved when the next operation is performed.

SUMMARY OF THE INVENTION

This invention at least reduces such problems involved in the known technologies. According to some aspects of the invention, a display control apparatus and a display control method are provided that provide a screen display with which the operability when a desired position can be selected from a plurality of positions is improved.

According to an aspect of the present invention, there is provided a display control apparatus comprising: a display control unit configured to perform control to display an indicator that indicates a position selected according to a selection operation performed by a user, from among a plurality of positions that are displayed on a display screen; a setting unit configured to set, as a movement amount of a selection candidate that can be selected from among the plurality of positions according to a selection operation performed by the user, at least a first movement amount or a second movement amount; and a control unit configured to perform control so as to, in a case of the first movement amount being set, display a position of a selection candidate that can be selected, from a position at which the indicator is displayed, according to a selection operation performed by the user, in a first display form so as to be distinguishable from other positions, and in a case of the second movement amount being set, display a position of a selection candidate that can be selected, from the position at which the indicator is displayed, according to a selection operation performed by the user, in the first display form so as to be distinguishable from other positions.

According to an aspect of the present invention, there is provided a control method of a display control apparatus that includes: display control means for performing control to display an indicator that indicates a position selected according to a selection operation performed by a user, from among a plurality of positions that are displayed on a display screen; and setting means for setting, as a movement amount of a selection candidate that can be selected from among the plurality of positions according to a selection operation performed by the user, at least setting a first movement amount or a second movement amount, wherein the control method comprises: in a case of the first movement amount being set, displaying, by the display control means, a position of a selection candidate that can be selected, from a position at which the indicator is displayed, according to a selection operation performed by the user, in a first display form so as to be distinguishable from other positions, and in a case of the second movement amount being set, displaying, by the display control means, a position of a selection candidate that can be selected, from the positions at which the indicator being displayed, according to a selection operation performed by the user, in the first display form so as to be distinguishable from other positions.

According to an aspect of the present invention, there is provided a non-transitory computer-readable storage medium storing a program for causing a computer to function as a display control apparatus comprising: a display control unit configured to perform control to display an indicator that indicates a position selected according to a selection operation performed by a user, from among a plurality of positions that are displayed on a display screen; a setting unit configured to set, as a movement amount of a selection candidate that can be selected from among the plurality of positions according to a selection operation performed by the user, at least a first movement amount or a second movement amount; and a control unit configured to perform control so as to, in a case of the first movement amount being set, display a position of a selection candidate that can be selected, from a position at which the indicator is displayed, according to a selection operation performed by the user, in a first display form so as to be distinguishable from other positions, and in a case of the second movement amount being set, display a position of a selection candidate that can be selected, from the position at which the indicator is displayed, according to a selection operation performed by the user, in the first display form so as to be distinguishable from other positions.

Further features of the present invention will become apparent from the following description of exemplary embodiments (with reference to the attached drawings).

BRIEF DESCRIPTION OF THE DRAWINGS

FIG. 8 is a flowchart relating to unit movement amount change processing of a digital camera according to another embodiment.

DESCRIPTION OF THE EMBODIMENTS

Hereinafter, exemplary embodiments of the present invention will be described in detail with reference to the attached drawings. Note that, hereinafter, embodiments of a digital camera serving as an example of a display control apparatus according to the present invention will be described. However, the present invention can be implemented in any electronic device in which a graphical user interface (GUI) can be used. Also, although the display control to be performed when a candidate of the focus detection region (AF frame) can be selected will be described in the following, the selection candidate is not limited to the AF frame, and may be the setting of an AE frame, a menu item, and the like. Also, from the viewpoint of a selected position being moved by a predetermined operation, the present invention can be applied to an operation for moving a cursor from a current position to a separated position, in addition to the case where a specific item can be selected. These operations include moving a cursor on a map, changing an enlargement/reduction region in an image, moving an input position of a character (numerical value), moving an indicator on a bar for setting a setting value, and the like, but are not limited thereto.

First Embodiment

Figure 1A:
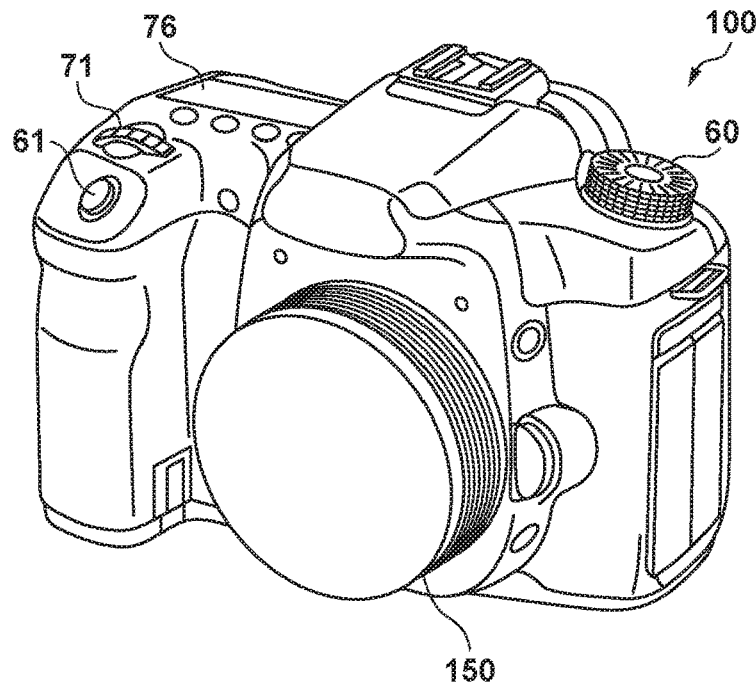
FIGS. 1A and 1B are diagrams illustrating an exemplary external view of a digital camera serving as an example of a display control apparatus according to an embodiment.
Figure 1B:
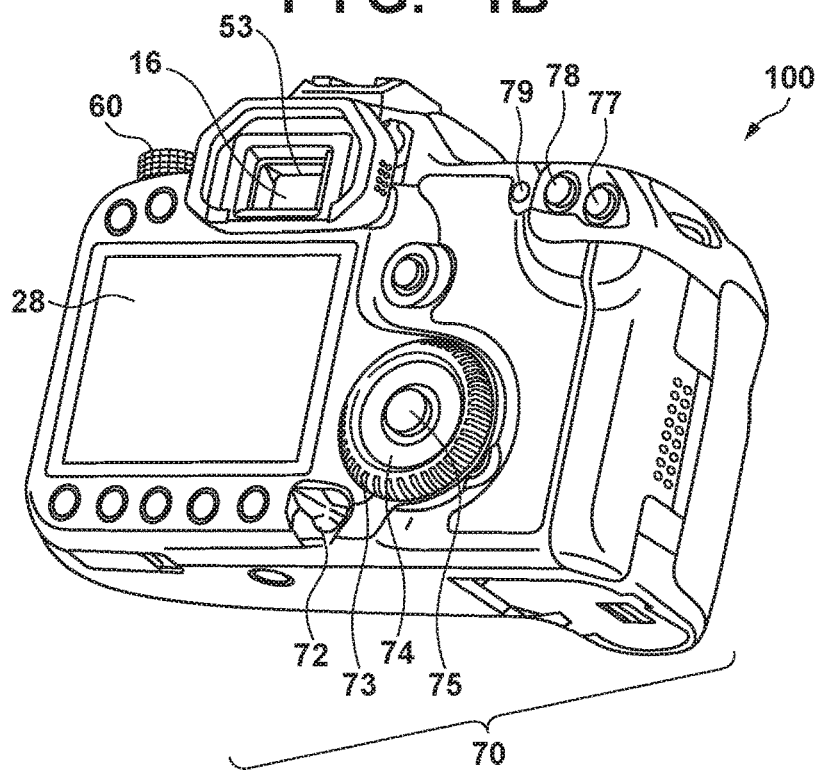

FIGS. 1A and 1B are diagrams illustrating an exemplary external view of a digital camera 100 according to the present embodiment, FIG. 1A is a front perspective view, and FIG. 1B is a back perspective view. A display unit 28 is a touch display, for example, and displays a live view image, a recorded image, a GUI screen, various types of information, and the like. A shutter button 61 is for giving an instruction to start a shooting preparation operation and a shooting operation to the digital camera 100. A mode selection switch 60 is used for switching an operation mode and a shooting mode of the digital camera 100. A main electronic dial 71 is rotatable, and is used for setting the shutter speed, the F-number, and the like, for example.

A power supply switch 72 is used for switching on/off of a power supply of the digital camera 100. A sub electronic dial 73 is rotatable, and is used for moving a selected position and a cursor, and for scrolling images. A ring-shaped cross key (direction key) 74 provided inside the sub electronic dial 73 includes switches in upper, lower, left, right portions, respectively. Note that the cross key 74 may be configured to be able to detect pressing in an oblique direction such as determining that an upper right portion has been pressed when both of an upper switch and a right switch are turned on. The sub electronic dial 73 and a SET button (determination button) 75 provided at a center position of the cross key 74 are mainly used for determining a selected item.

An AF frame selection mode button 76 is used for transitioning, in a shooting mode, to a mode in which AF frame selection is performed. An enlargement button 77 is used for switching on/off of an enlarged display of a live view image, and for increasing the magnification while the enlarged display is performed. The enlargement button 77 is also used for switching on/off of an enlarged display of a reproduced image in a reproduction mode, and for increasing the magnification while the enlarged display is performed. A reduction button 78 is used for reducing the magnification of an image that is in an enlarged display, conversely to the enlargement button 77. A switching button 79 is used for switching a movement amount of a selected position in an AF frame selection mode. Note that, in an operation state other than the AF frame selection mode, another function may be assigned to the switching button 79. Note that the input devices such as the above-described buttons, dials, and switches, and a touch paned constitutes a portion of the operation unit 70 of the digital camera 100.

A lens unit 150 includes a plurality of lenses including a focus lens, an aperture, and a motor, an actuator and a control circuit for driving the focus lens and the aperture, and the like. The lens unit 150 may be or may not be detachable. A viewfinder 16 includes an optical system (such as an eyepiece lens and a prism) for observing a focusing screen provided inside the digital camera 100. A user can check, by looking into the viewfinder 16, the degree of focus and composition of a subject optical image formed on the focusing screen by the lens unit 150. A proximity sensor 91 provided in the vicinity of the viewfinder 16. The proximity sensor 91 detects that an object is in the proximity of the eyepiece unit (a state in which a user is looking into the viewfinder). Also, an in-viewfinder display unit 53 is provided inside the digital camera 100. That is, the display screen of the in-viewfinder display unit 53 is visible through the viewfinder. An indicator (frame shaped indicator, for example) that indicates the position and the size of the current focus detection region, shooting conditions (such as shutter speed, F-number, and sensitivity), numerical values indicating setting values, icons, and the like are displayed in the in-viewfinder display unit 53. Note that the focus detection region is also referred to as an AF frame or an AF area. At least some of the display of the in-viewfinder display unit 53 is observed in a manner of being superimposed on an optical image formed on the focusing screen.

Figure 2:
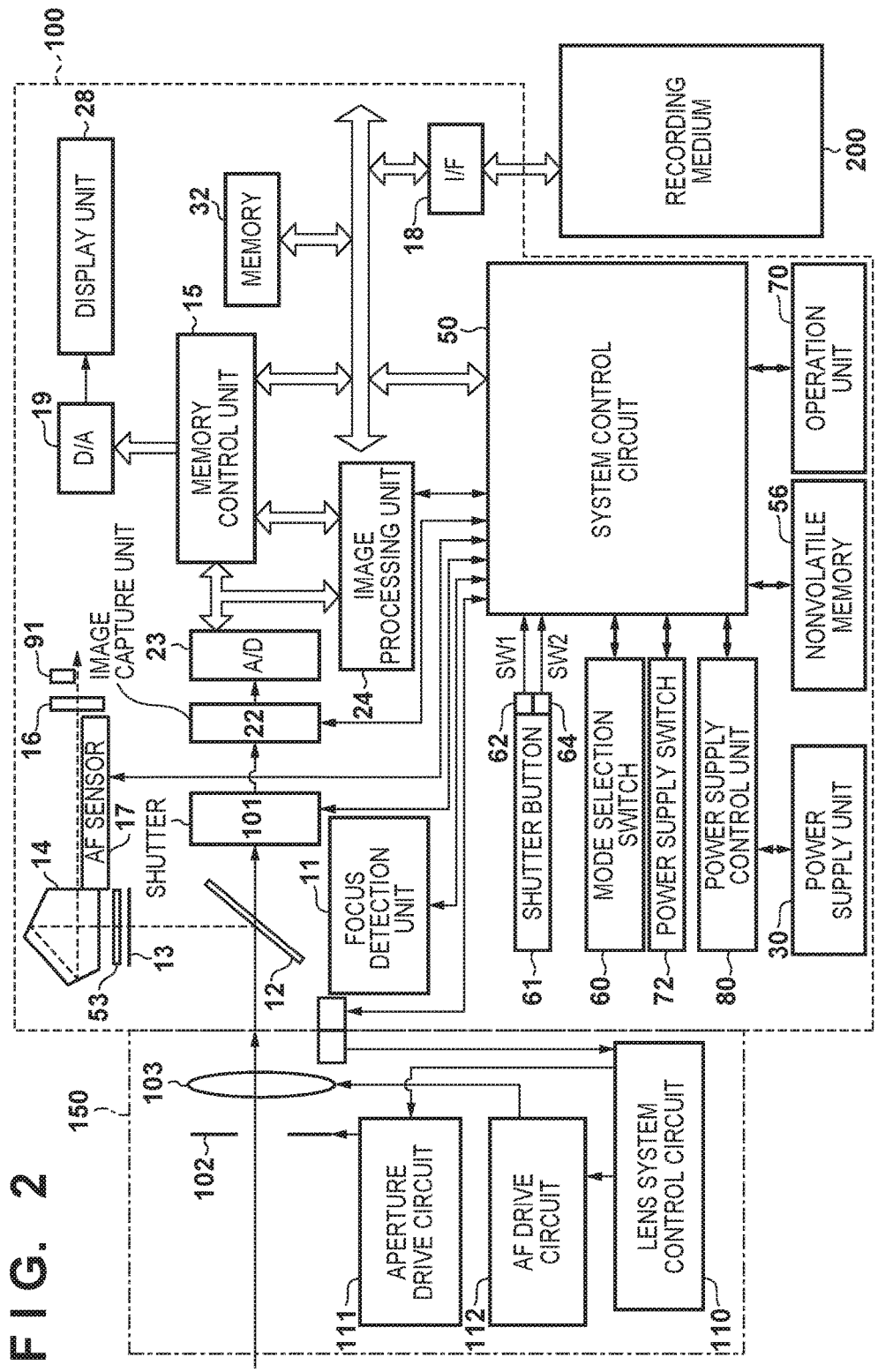
FIG. 2 is a block diagram illustrating as exemplary functional configuration of the digital camera according to the embodiment.

FIG. 2 is a block diagram illustrating an exemplary functional configuration of the digital camera 100 shown in FIGS. 1A and 1B, with the same reference numerals assigned to the constituent elements shown in FIGS. 1A and 1B. The lens unit 150 includes a lens system control circuit 110 that controls operations of the lens unit 150. The lens system control circuit 110 controls the aperture diameter (F-number) of the aperture 102 by controlling operations of an aperture drive circuit 111 in accordance with an instruction from a system control unit 50 (including at least one processor or a circuit). The lens system control circuit 110 also drives the focus lens 103 by controlling operations of an AF drive circuit 112 in accordance with an instruction from the system control unit 50. Note that lenses other than the focus lens 103 are omitted in FIG. 2.

An AE sensor 17 obtains luminance information regarding a subject optical image formed on the focusing screen 13 by the lens unit 150 and a quick return mirror 12 (hereinafter referred to as a mirror 12).

A focus detection unit 11 (AF sensor) captures an image that is formed by light incident via the mirror 12 and a sub-mirror that is provided in the back surface thereof while performing pupil division, computes a defocus amount using a phase-difference detection method, and outputs the computed result to the system control unit 50. The system control unit 50 performs focus adjustment of the lens unit 150 by controlling the position of the focus lens 103 in the lens unit 150 based on this defocus amount information.

The mirror 12 is moved up and down by the system control unit 50. The mirror 12, in a shown down state, reflects a subject optical image to the viewfinder 16, and causes a light beam that has passed through a half mirror region to be incident on the focus detection unit 11 through the sub-mirror. On the other hand, when in an up state, the mirror 12 moves out of the Might path. With this, the subject optical image is formed on an imaging plane of the image capturing unit 22, and the image capturing unit 22 can perform shooting.

Therefore, the system control unit 50 controls the mirror 12 to be in an up state in the exposure period in still image shooting and moving image shooting (including live view shooting), and controls the mirror 12 to be in a down state in other periods. Note that the mirror 12 may be moved up or down based on an instruction made by a user.

A focal plane shutter 101 (hereinafter, referred to as a shutter 101) opens and closes under the control of the system control unit 50, and controls the exposure time of the image capturing unit 22. The image capturing unit 22 is a CCD image sensor or a CMOS image sensor that includes a plurality of photoelectric conversion regions, in each of which charges corresponding to the amount of incident light are generated, and converts the optical image to a group of electrical signals (analog image signals). The operation of the image capturing unit 22 is controlled by the system control unit 50.

An A/D converter 23 is used to convert an analog image signal output from the image capturing unit 22 to a digital image signal (image data). Note that the A/D converter 23 may be included in the image capturing unit 22.

An image processing unit 24 applies various types of image processing to the image data supplied from the A/D converter 23 or a memory control unit 15. The image processing that the image processing unit 24 can execute includes white balance adjustment, demosaicing processing, hue correction processing, object recognition processing, object tracking processing, scaling processing, filtering processing, encoding processing, decoding processing, or the like, but is not limited thereto.

The memory control unit 15 saves image data output from the A/D converter 23 or the image processing circuit 24 in a memory 32, and outputs image data stored in the memory 32 to the image processing circuit 24. Also, the memory control unit 15 records image data in a recording medium 200 such as a memory card via the recording medium I/F 18, and saves image data read out from the recording medium 200 in the memory 32.

The memory 32 is used for storing image data output from the A/D converter 23, and image data processed (or under processing) by the image processing unit 24. The memory 32 also functions as a memory (video memory) for image display, and the memory control unit 15 supplies display image data stored in the memory 32 to a D/A converter 19.

The D/A converter 19 converts the display image data to an analog signal with which the display unit 28 can display an image, and supplies the analog signal to the display unit 28. The display unit 28 is a touch display, for example, and is provided on the back face of the digital camera 100, as shown in FIG. 1B. The display unit 28 performs display in accordance with the analog signal from the D/A converter 19.

The digital camera 100 of the present embodiment performs moving image shooting at a predetermined frame rate in order to perform live view display in the display unit 28 in a stand-by state of a shooting mode. The memory control unit 15 stores, to the memory 32, display image data generated in the image processing unit 24 from a frame image obtained through the moving image shooting. Also, the memory control unit 15 reads out display image data stored in the memory 32, and supplies the display image data to the D/A converter 19. As a result of continuously shooting a moving image, generating display image data, and supplying the display image data to the display unit 28 via the D/A converter 19, the live view display in the display unit 28 can be realized.

A nonvolatile memory 56 is a memory that can be electrically erased and recorded by the system control unit 50, and is an EEPROM or the like, for example. Programs that can be executed by a programmable processor included in the system control unit 50, constants for operations, setting values, GUI data, and the like are stored in the nonvolatile memory 56.

The system control unit 50 includes at least one programmable processor, deploys programs, which are stored in the nonvolatile memory 56, in a system memory 52, causes the programmable processor to execute the programs, and as a result, the operations of the digital camera 100 are realized. The system control unit 50 also controls display operations in the digital camera 100 by controlling the memory 32, the D/A converter 19, the display unit 28, the in-viewfinder display unit 53, and the like.

The system control unit 50 also controls an automatic focus detection (AF) operation based on the defocus amount obtained by the focus detection unit 11, and an automatic exposure control (AE) operation based on the luminance information obtained by the AE sensor 17.

The shutter button 61 includes a first shutter switch 62, which is turned on when pressed halfway, and a second shutter switch 64, which is turned on when fully pressed. The system control unit 50 interprets the ON state of the first shutter switch 62 as a shooting preparation start instruction, and interprets the ON state of the second shutter switch 64 as a shooting start instruction. Shooting preparation processing includes AF processing, AE processing, AWB (auto white balance) processing, EF (flash pre-emission) processing, and the like. Shooting processing refers to a series of processes ranging from exposure performed in the image capturing unit 22 and readout of signals, to writing of image data to the recording medium 200.

An operation unit 70 is an input device group that is provided in the digital camera 100 and can be operated by a user, and includes the switches, the buttons, and the dials described using FIGS. 1A and 1B. The mode selection switch 60, the shutter button 61, and the touch panel included in the display unit 28, which are described independently for the sake of convenience, also constitute a part of the operation unit 70.

A power supply control unit 80 is constituted by a battery detection circuit, a DC-DC converter, a switching circuit for switching a block to which power is supplied, and the like, and detects whether or not a battery is attached, the type of the battery, the residual amount of the battery, and the like. The power supply control unit 80 also controls the DC/DC converter based on the detection result and an instruction from the system control unit 50, and supplies the necessary voltage to each unit.

A power supply unit 30 may be a battery, an AC adapter, or the like. A recording medium I/F 18 is an interface for the recording medium 200, which is a memory card, a hard disk, or the like.

Figure 4:
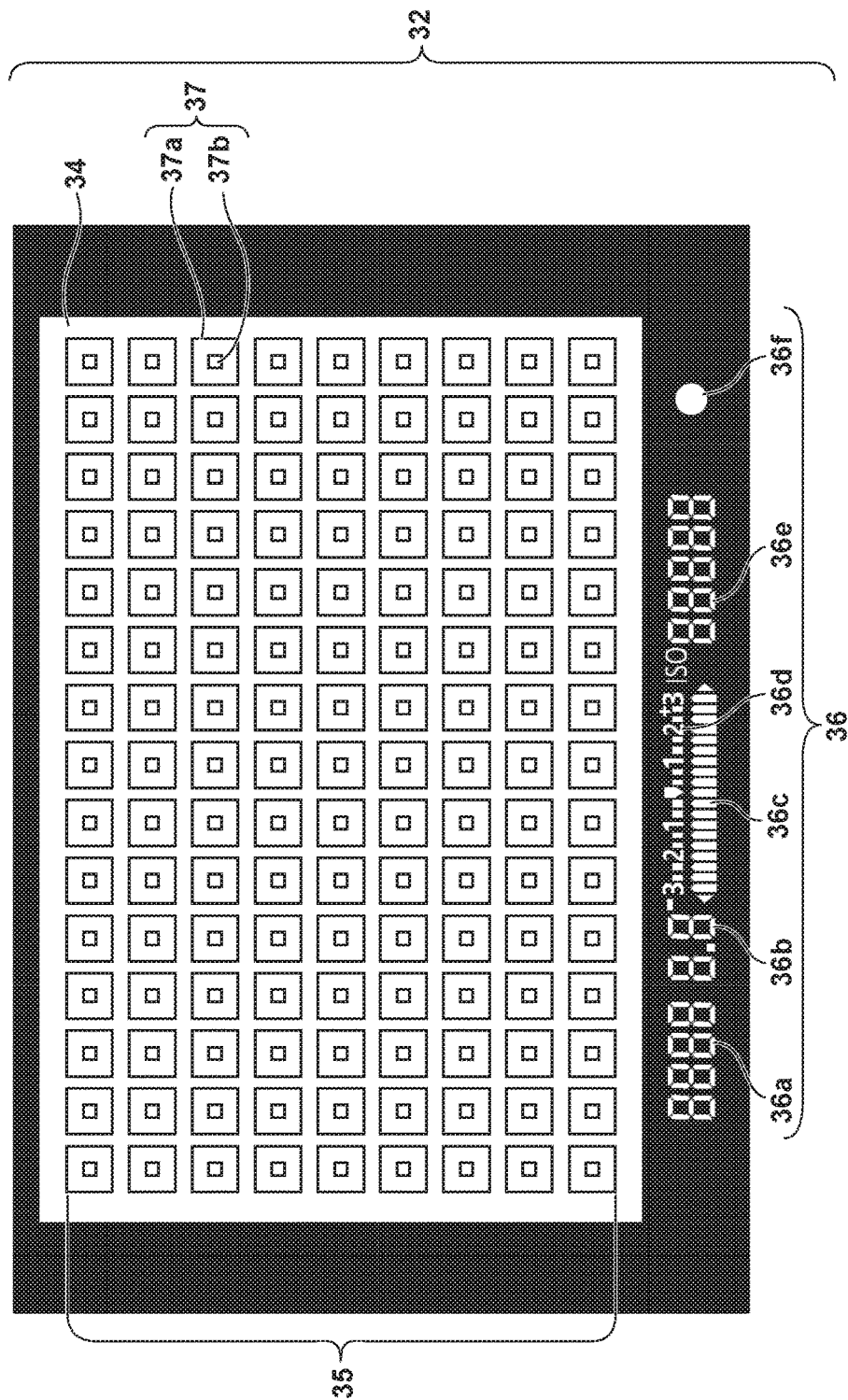
FIG. 4 is a diagram illustrating an exemplary viewfinder display of the digital camera according to the embodiment.

FIG. 4 is a diagram illustrating an exemplary display of the in-viewfinder display unit 53.

The in-viewfinder display unit 53 includes a visual field display region 35 and an information display region 36. The display content in the visual field display region 35 can be observed through the viewfinder 16 as a display that is superimposed on an optical image. Because the in-viewfinder display unit 53 is arranged above the focusing screen in the present embodiment, the in-viewfinder display unit 53 is constituted by a transmission type display apparatus such as a polymer network liquid crystal display (PNLCD) having high transmittance.

A selection frame 37 for indicating a position at which the focus detection region (AF frame) can be set is displayed in the visual field display region 35 (FIG. 4 shows a state in which all of the selection frames 37 are displayed). Each selection frame 37 is constituted by a frame 37*a* and a dot 37*b* arranged at the center of the frame 37*a*, and either of or both of them can be displayed. In the case where the in-viewfinder display unit 53 is a monochrome LCD, the selection frame 37 is displayed in a black color. However, a portion where a red color is desired to be displayed and a portion where a black color is desired to be displayed are alternatingly displayed, and the visual field display region 35 is illuminated by red light only in a period in which the portion where a red color is desired to be displayed is displayed, and as a result, it is possible that a user perceives that a red color display and a black color display co-exist (display colors are different), for example. In the following, display control for causing a user to perceive a red color display by also using red color illumination is referred to as a red color display, for the sake of convenience. The visual field display region 35 can be illuminated by an LED provided at a side of the in-viewfinder display unit 53, for example.

Note that a red color display at different levels of brightness may be performed by dividing the display period into three or more periods, namely, a period of no illumination, a period of illumination at a normal brightness, and a period of illumination at a higher brightness. Similarly, display of three or more colors may be realized by using illumination with two or more colors. Alternatively, the in-viewfinder display unit 53 itself may be configured to be able to perform multicolor display. Also, a user is made to perceive that the display is blinking by controlling the display period, and this display is referred to as a blinking display for the sake of convenience.

In the digital camera 100 of the present embodiment, positions at which the AF frame can be set are provided at nine locations in a vertical direction, and at 15 locations in a horizontal direction. Therefore, 135 selection frames 37, that is, nine rows in the vertical direction and 15 columns in the horizontal direction, are arranged in the visual field display region 35.

An information display region 36 is mainly used for displaying shooting conditions. FIG. 4 shows an example in which the information display region 36 is constituted by a shutter speed display 36*a*, an aperture display 36*b*, a shift amount display 36*c*, an indicator 36*d*, an ISO speed display 36*e*, and a focus display 36*f*. The shutter speed display 36*a* indicates the shutter speed, and the aperture display 36*b* indicates the F-number. The shift amount display 36*c* indicates the shift amount relative to the correct exposure (exposure correction amount), and the indicator 36*d* is an indicator of the shift amount. The ISO speed display 36*e* indicates the ISO speed. The focus display 36*f* indicates an in-focus state by being lit, and an out-of-focus state by not being lit.

In the digital camera 100 of the present embodiment, the AG frame can be set to one of a predetermined plurality of settable positions through an operation made on the operation unit 70. Specifically, the system control unit 50, upon once detecting a predetermined directional operation in an AF frame selection mode, moves the position display that is provisionally set in the in-viewfinder display unit 53 in a direction according to the detected operation by a predetermined amount in a coordinate system constituted by settable positions of the AF frame. Then, the system control unit 50 sets an AF frame corresponding to the provisionally set position display at a point in time when an operation to issue a determination instruction is detected. Note that the coordinate system constituted by settable positions of the AF frame is an orthogonal coordinate system whose coordinate values in the vertical direction are one to nine and whose coordinate values in the horizontal direction are one to fifteen, in the example in FIG. 4. The range of the coordinate values may change according to the origin.

Here, the directional predetermined operation (selection operation) includes pressing of the cross key 74, a drag operation detected in a touch panel, a rotation of a dial, or the like, but is not limited thereto. One operation is assumed to be detected every time an input that is continuous over a predetermined time or a distance is detected, for example. Therefore, the system control unit 50 detects one operation every time a predetermined time has elapsed with respect to a long press of a switch or a button, and detects one operation every time the continuous touch position has moved a predetermined distance with respect to the drag operation on a touch panel. Also, the operation to issue the determination instruction includes pressing (on) of the SET button 75, a double tap operation on the touch panel, or the like, but is not limited thereto.

In the present embodiment, the positional movement amount (also referred to as unit movement amount) per one operation is made variable. Here, a description will be given is which the movement amount changes between three levels will be described, as an example, but the levels may be two or more. Also, in order to facilitate description and understanding, the predetermined operation is assumed to be pressing of the cross key 74.

Here, the directions is which a provisionally set position can be moved is assumed to be vertical and horizontal directions, and the following assumptions are made.

Level 1: the unit movement amount is 1 in the vertical direction and the horizontal direction Level 2: the unit movement amount is the vertical direction is 2, and the unit movement amount is the horizontal direction is 4

Level 3: the unit movement amount in the vertical direction is 4, and the unit movement amount in the horizontal direction is 7

Level 2 corresponds to a movement amount of about a quarter of the total (15) settable positions in the row direction and a quarter of the total (9) settable positions in the column direction. Also, Level 3 corresponds to a movement amount of about a half of the total (15) settable positions in the row direction and a half of the total (9) settable positions in the column direction. Also, in the case where an input in an oblique direction is validated, a unit movement amount in the oblique direction may be set separately, or a position may be moved by the unit movement amounts in the vertical direction and the horizontal direction.

In the case of Level 2 or 3 being set, since the position can be moved at a greater rate by a number of operations smaller than that at Level 1, which is a normal setting, the operability in the case where there are many settable positions can be improved. On the other hand, one position can be selected from all of the settable positions in the case of the unit movement amount at Level 1 being set, but the number of selectable positions decreases as the level increases. Accordingly, changing of the positional movement amount per one operation is equivalent to changing the number of selectable positions.

In the present embodiment, the switching of the unit movement amount can be performed in response to pressing of the switching button 79. For example, a configuration may be adopted in which every time the switching button 79 is pressed, the level increases, and at the maximum level, the level is switched to the minimum level. In this case, in the example described above, the level is switched in the order of Level 1, Level 2, Level 3, Level 1, and so on, every time the switching button 79 is pressed.

Note that the switching of the unit movement amount may be performed in response to an operation performed on the sub electronic dial 73 or the touch panel of the display unit 28. In the case of using a rotation member such as the sub electronic dial 73, increasing and decreasing the level may be switched according to the rotation direction. Also, in the case of the operation being performed on the touch panel, the level may be switched every time a tap operation is detected, for example. Also, in the case where the detection as to whether or not a user is looking through the viewfinder 16 can be performed by the proximity sensor 91 or the like, the switching operation may be changed according to the detection result. For example, in the case where the user is not looking through the viewfinder 16, a list of levels of the unit movement amount is displayed according to an operation performed on the touch panel, and the user can directly set any level of the unit movement amount.

As a result of the positional movement amount (unit movement amount) per one predetermined operation (selection operation) being made variable, the number of selectable positions changes according to the currently set unit movement amount. Therefore, in the present embodiment, the display in the in-viewfinder display unit 53 is controlled, indicators that indicate candidates of the position to which the selected position can be moved by the next operation are displayed, and as a result, information regarding the currently set unit movement amount ant settable positions can be provided to the user. A specific example of a display method of the indicator will be described later.

Figure 5:
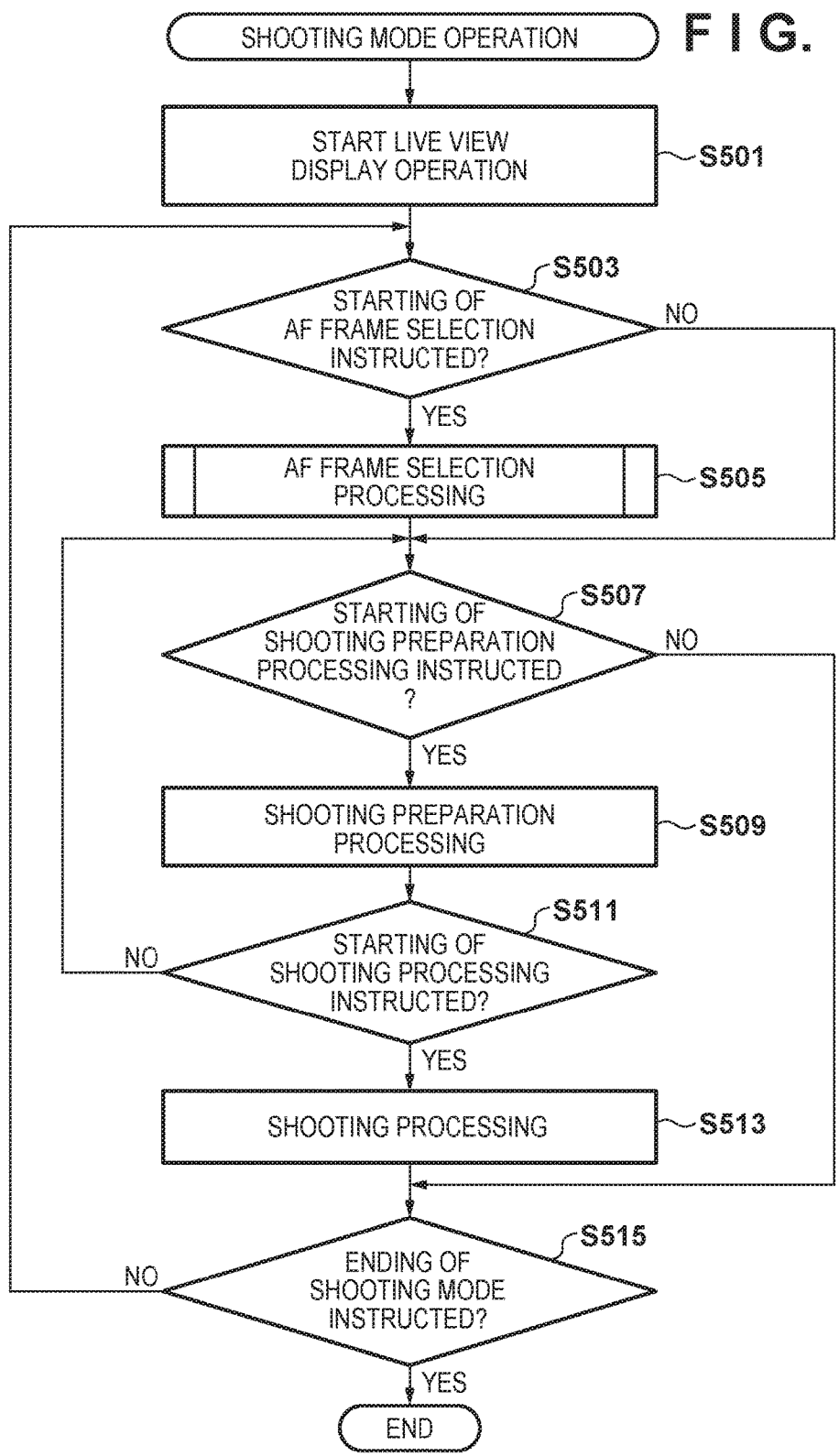
FIG. 5 is a flowchart relating to an operation in a shooting mode of the digital camera according to the embodiment.

FIG. 5 is a flowchart illustrating an outline of the operation in the shooting mode of the digital camera 100. The operations illustrated in the flowchart in FIG. 5 are realized by the system control unit 50 deploying programs stored in the nonvolatile memory 56 in the system memory 52 and executing the programs to control the units of the digital camera 100.

Upon the power supply of the digital camera 100 being turned on as a result of the power supply switch 72 of the operation unit 70 being operated or the like, the system control unit 50 executes initialization processing and the like, starts operating in the shooting mode, and a shooting stand-by state is realized (S501). In the shooting stand-by state, the system control unit 50 continuously executes moving image shooting and displaying the shot moving image such that the display unit 28 functions as an electronic viewfinder, and monitors the operations performed on the operation unit 70.

In step S503, the system control unit 50 determines whether or not as instruction to start selection of the AF frame has been received, advances the processing to step S505 if it is determined that the instruction has been received, and advances the processing to step S507 if not. The instruction to start selection of the AF frame may be pressing of the AF frame selection mode button 76, for example.

In step S505, the system control unit 50 executes AF frame selection processing, sets the AF frame in accordance with the instruction performed by the user, and advances the processing to step S507. The AF frame selection processing will be described in detail later using the flowcharts in FIGS. 6A to 7.

In step S507, the system control unit 50 determines whether or not an instruction to start shooting preparation processing has been received, advances the processing to step S509 if it is determined that the instruction has been received, and advances the processing to step S515 if not. The instruction to start the shooting preparation processing may be turning on of the first shutter switch 62, for example.

In step S509, the system control unit 50 performs the shooting preparation processing, and advances the processing to step S511. The shooting preparation processing includes AF (autofocus) processing, AE (automatic exposure) processing, AWB (auto white balance) processing, EF (flash pre-emission) processing, and the like.

In step S511, the system control unit 50 determines whether or not an instruction to start shooting processing has been received, advances the processing to step S513 if it is determined that the instruction has been received, and advances the processing to step S515 if not. The instruction to start the shooting processing may be turning on of the second shutter switch 64, for example.

In step S513, the system control unit 50 performs the shooting processing, and advances the processing to step S515. The shooting processing refers to a series of processes ranging from exposure of the image capturing unit 22 and readout of signals, to writing of image data to the recording medium 200. Note that when continuous shooting is performed such as when the second shutter switch 64 is continuously turned on or when bracket shooting is performed, the shooting operation is continued.

When the shooting processing is ended, in step S515, the system control unit 50 determines whether or not an instruction to end the shooting mode has been received, ends operation in the shooting mode if it is determined that the instruction has been received, and returns the processing to step S503 if not. The instruction to end the shooting mode may be an instruction to transition to a reproduction mode or an instruction to turn off the power supply, for example.

Figure 6A:
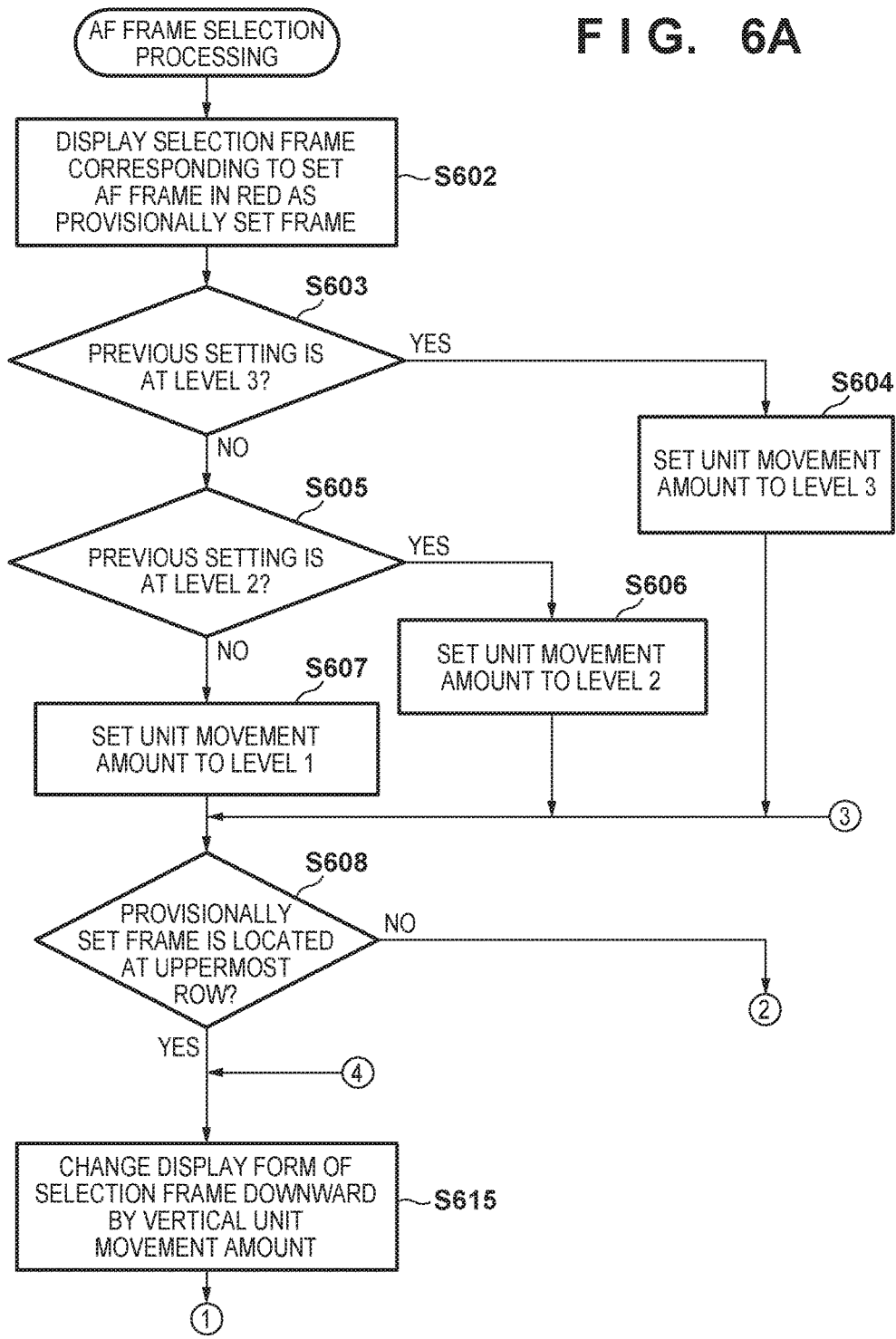
FIGS. 6A to 6D are flowcharts relating to AF frame selection processing of the digital camera according to the embodiment.
Figure 6B:
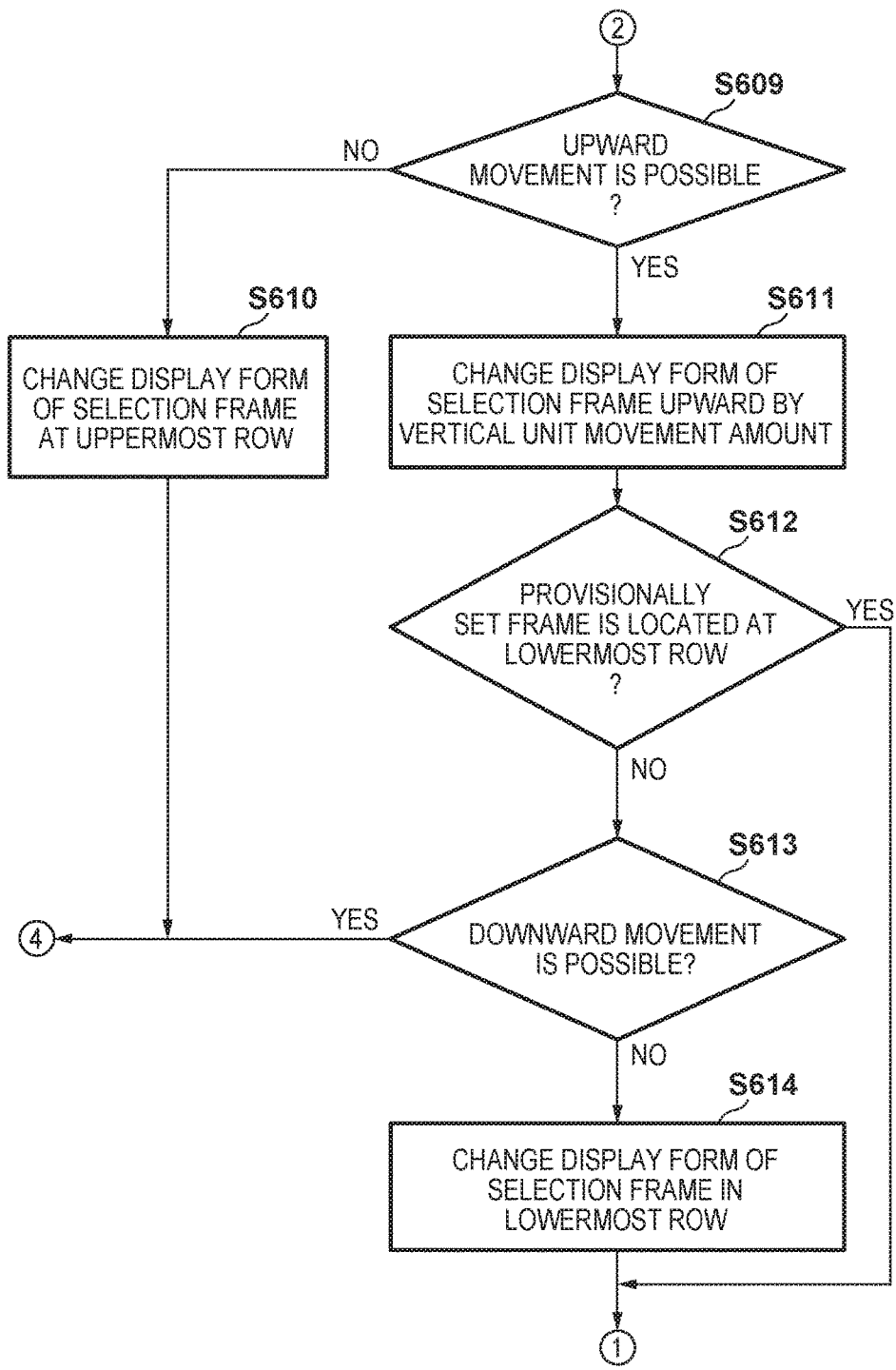
Figure 6C:
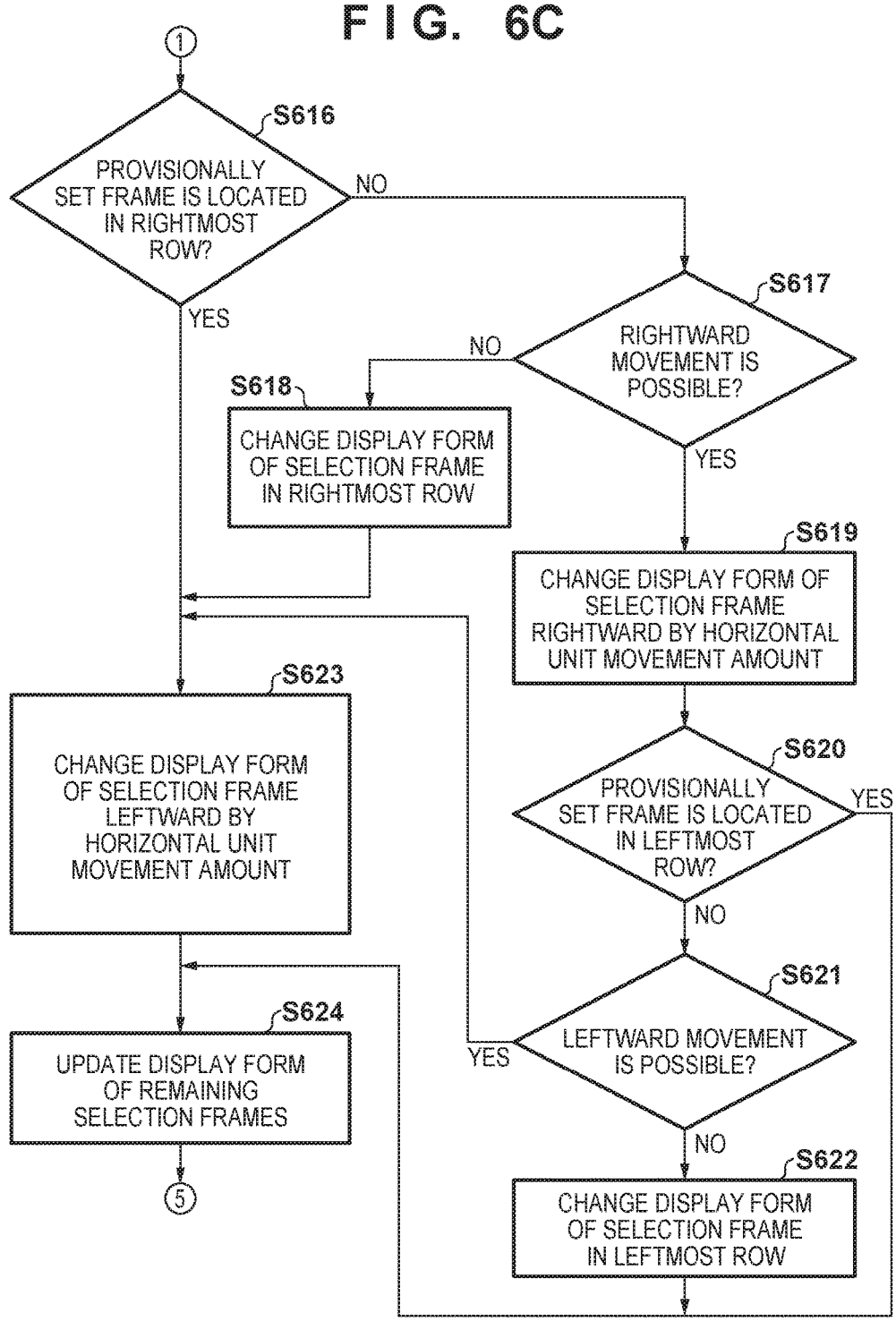

Next, the AF frame selection processing executed in step S505 in FIG. 5 will be described in detail using the flowcharts in FIGS. 6A to 7. The operations illustrated in the flowcharts in FIGS. 6A to 7 are realized by the system control unit 50 deploying programs, which are stored in the nonvolatile memory 56, in the system memory 52 and executing the programs to control the units of the digital camera 100.

In step S602, the system control unit 50 displays, in the in-viewfinder display unit 53, a selection frame 37 at a reference position in a discriminative manner using a position corresponding to the currently set AF frame, as an initial value of the position (reference position) of the currently selected selection frame in the AF frame selection processing. Note that, in the following description, the selection frame at the reference position may be referred to as a provisionally set frame as well. The position information of the currently set AF frame is stored in the nonvolatile memory 56, for example. For example, the system control unit 50 can control the display performed in the in-viewfinder display unit 53 such that only the frame 37a is displayed with respect to the provisionally set frame, and only the point 37b is displayed in each of the other selection frames 37. Also, the system control unit 50 may control the display performed in the in display unit 53 such that the provisionally set frame can be observed in a red color, and the other selection frames 37 can be observed in a black color (display colors are differentiated). These are examples, and other display forms can be adopted.

Note that, in the shooting mode, the system control unit 50 can control the display performed in the in-viewfinder display unit 53, in a state of not being in the AF frame selection processing, such that the selection frame corresponding to the currently set AF frame is displayed, and the other selection frames are not displayed.

In step S603, the system control unit 50 refers to the nonvolatile memory 56, for example, determines whether or not the recently set unit movement amount is at Level 3, advances the processing to step S604 if it is determined to be at Level 3, and advances the processing to step S605 if not.

In step S604, the system control unit 50 sets the unit movement amount to Level 3, and advances the processing to step S605.

In step S605, the system control unit 50 refers to the nonvolatile memory 56, for example, determines whether or not the recently set unit movement amount is at Level 2, advances the processing to step S606 if it is determined to be at Level 2, and advances the processing to step S607 if not.

In step S606, the system control unit 50 sets the unit movement amount to Level 2, and advances the processing to step S608.

In step S607, the system control unit 50 sets the unit movement amount to Level 1, and advances the processing to step S608.

Note that the processing in steps S603 to S607 may be replaced with processing in which the latest setting value is set as is.

In step S608, the system control unit 50 determines whether or not the provisionally set frame is positioned in the uppermost row, advances the processing to step S615 if it is determined to be positioned in the uppermost row, and advances the processing to step S609 if not. Note that, here, upper corresponds to an upward direction in the drawings of FIGS. 1A and 1B.

In step S609, the system control unit 50 determines whether or not the provisionally set frame can move upward from the current position (reference position) by the unit movement amount, advances the processing to step S611 if it is determined that the movement is possible, and advances the processing to step S610 if not. This determination may be determination as to whether the number of settable positions of the AF frame or the selection frames that are positioned above the reference position is larger than or equal to the unit movement amount in the vertical direction at the currently set level.

In step S610, the system control unit 50 changes the display form of the point 37b of the selection frame 37 that is in the same column as the provisionally set frame and in the upper most row, and advances the processing to step S612.

In step S611, the system control unit 50 changes the display form of the point 37b of the selection frame 37 that is in the same column as the provisionally set frame and is thereabove by the unit movement amount in the vertical direction, and advances the processing to step S612.

In step S612, the system control unit 50 determines whether or not the provisionally set frame is positioned in the lowermost row, advances the processing to step S616 if it is determined to be positioned in the lowermost row, and advances the processing to step S613 if not.

In step S613, the system control unit 50 determines whether or not the provisionally set frame can move downward from the current position (reference position) by the unit movement amount, advances the processing to step S615 if it is determined that the movement is possible, and advances the processing to step S614 if not. This determination may be determination as to whether the number of settable positions of the AF frame or the selection frames that are positioned below the reference position is larger than or equal to the unit movement amount in the vertical direction at the currently set level.

In step S614, the system control unit 50 changes the display form of the point 37b of the selection frame 37 that is in the same column as the provisionally set frame and in the lowermost row, and advances the processing to step S616.

In step S615, the system control unit 50 changes the display form of the point 37b of the selection frame 37 that is in the same column as the provisionally set frame and is therebelow by the unit movement amount in the vertical direction, and advances the processing to step S616.

The changes of the display form in steps S614 and S615 are respectively similar to those in steps S610 and S611.

In step S616, the system control unit 50 determines whether or not the provisionally set frame is positioned in the rightmost column, advances the processing to step S623 if it is determined to be positioned in the rightmost column, and advances the processing to step S617 if not.

In step S617, the system control unit 50 determines whether or not the provisionally set frame can move rightward from the current position (reference position) by the unit movement amount, advances the processing to step S619 if it is determined that the movement is possible, and advances the processing to step S618 if not. This determination may be determination as to whether the number of settable positions of the AF frame or the selection frames that are positioned rightward of the reference position is larger than or equal to the unit movement amount in the horizontal direction at the currently set level.

In step S618, the system control unit 50 changes the display form of the point 37b of the selection frame 37 that is in the same row as the provisionally set frame and in the rightmost column, and advances the processing to step S623.

In step S619, the system control unit 50 changes the display form of the point 37b of the selection frame 37 that is in the same row as the provisionally set frame and is rightward thereof by the unit movement amount in the horizontal direction, and advances the processing to step S620.

In step S620, the system control unit 50 determines whether or not the provisionally set frame is positioned in the leftmost column, advances the processing to step S624 if it is determined to be positioned in the leftmost column, and advances the processing to step S621 if not.

In step S621, the system control unit 50 determines whether or not the provisionally set frame can move leftward from the current position (reference position) by the unit movement amount, advances the processing to step S623 if it is determined that the movement is possible, and advances the processing to step S622 if not. This determination may be determination as to whether the number of settable positions of the AF frame or the selection frames that are positioned leftward of the reference position is larger than or equal to the unit movement amount in the horizontal direction at the currently set level.

In step S622, the system control unit 50 changes the display form of the point 37b of the selection frame 37 that is in the same row as the provisionally set frame and in the leftmost column, and advances the processing to step S624.

In step S623, the system control unit 50 changes the display form of the point 37b of the selection frame 37 that is in the same row as the provisionally set frame and is leftward thereof by the unit movement amount in the horizontal direction, and advances the processing to step S624.

The changes of the display form in steps S622 and S623 are respectively similar to those in steps S619 and S618.

The processing in each of steps S610, S611, S614, S615, S618, S619, S622, and S623 is processing for determining the display position of an indicator that shows a candidate of the position to which the provisionally set frame will move when a predetermined operation is detected next. In other words, the selection frame to be the target of change in the display form in these steps is a candidate of the position to which the provisionally set frame will move when the predetermined operation is detected next, and the display after change is an indicator for indicating the position to be selected when the predetermined operation is next detected. Therefore, the user can comprehend the currently set unit movement amount and a candidate of the position (move position) of the AF frame that can be selected with the next operation, by looking into the viewfinder 16 and observing an optical viewfinder image. Therefore, in the case where the user cannot select a desired position due to the currently set unit movement amount being too large, the user can change the setting so as to reduce the unit movement amount, for example. Also, in the case where the user feels that it takes time to perform an operation to select a desired position with the currently set unit movement amount, the user can change the setting so as to increase the unit movement amount, for example.

In steps S610, S611, S614, S615, S618, S619, S622, and S623, if the display form before change is such that the frame 37a and the point 37b are not displayed, the display form after change may be such that the frame 37a and/or the point 37b are displayed in some form. If the display form before change is such that the frame 37a is not displayed and the point 37b is continuously displayed in a black color, the display after change may be such that the frame 37a is not displayed, and the point 37b is displayed in a manner of blinking in a black or red color, or the point 37b is continuously displayed in a red color. These are examples, and other display forms may be adopted. Note that, when the frame 37a is displayed, the display form is changed from that of the provisionally set frame. Note that, if the position of the AF frame that can be selected with the next operation is displayed, and the positions of the AF frame that cannot be selected with the next operation are not displayed, it is possible that the user will lose sight of the targeting AF frame. For example, assume that, when the user selects an AF frame apart from the current position, after selecting an AF frame that is close to the target by increasing the unit movement amount, the user tries to select the desired AF frame by decreasing the unit movement amount. At this time, if the target AF frame is not displayed when the unit movement amount is large, it is possible that the user will lose sight of the position of the target AF frame, and does not understand to which position the selected AF frame should be moved with the current unit movement amount.

In step S624, the system control unit 50 controls the in-viewfinder display unit 53 so as to update the display of all of the remaining selection frames (i.e., selection frames other than the provisionally set frame and the selection frame whose display form has been changed). The display form of the remaining selection frames is different from the display forms of the provisionally set frame and the selection frame whose display form has been changed. When the provisionally set frame is moved, the display forms of the provisionally set frame before movement and the selection frame of the movement destination candidate of the provisionally set frame are returned to the display form of the normal selection frame in step S624. The returning of the display forms of the provisionally set frame before movement and the selection frame of the movement destination candidate of the provisionally set frame may be executed when the provisionally set frame after movement is displayed and the display form of the selection frame of the movement destination candidate is accordingly changed.

In step S625, the system control unit 50 determines whether or not an instruction to change the unit movement amount has bees received, the processing advances to step S626 if it is determined that the instruction to change the unit movement amount has been received, and advances the processing to step S627 if not. The instruction to change the unit movement amount may be pressing (turning on) of the switching button 79.

In step S626, the system control unit 50 performs processing for changing the unit movement amount, and returns the processing to step S608. The processing for changing the unit movement amount will be described in detail using the flowchart in FIG. 7.

In step S627, the system control unit 50 determines whether or not an operation has been made on the cross key 74, advances the processing to step S628 if it is determined that the operation has bees made, and advances the processing to step S630 if not.

In step S626, the system control unit 50 moves the position (reference position) of the provisionally set frame to the position determined based on the operation direction (pressed position or position of the switch that has been turned on) of the cross key 74 and the unit movement amount. Specifically, the system control unit 50 stores the positions of the movement destination candidate of the provisionally set frame in each direction that have been obtained in steps S608 to S623 in the system memory 52. Then, in step S628, the system control unit 50 obtains the position of the movement destination candidate corresponding to the operation direction of the cross key 74 as the reference position after movement.

In step S629, the system control unit 50 changes the display such that the frame 37a of the selection frame (new provisionally set frame) corresponding to the reference position after movement obtained in step S628 is displayed in a red color, and the processing returns to step S608. Here, the selection frame to be the target of change in the display form is one of the four selection frames that indicate candidates of moved positions whose display form has been changed in steps S610, S611, S614, S615, S618, S619, S622, and S623. The display form of the three selection frames, of the four selection frames, that were not selection frames for the reference position after movement, and the provisionally set frame before movement may be returned to that of the normal selection frame at this point in time.

Note that while the AF frame selection processing of the present embodiment is under execution, the system control unit 50 controls the display of the in-viewfinder display unit 53 such that the selection frame can be displayed in the following forms.

Selection frame of reference position (provisionally set frame): frame 37a is displayed in a red color, and point 37b is not displayed (steps S602 and S628)

Selection frame indicating a candidate of moved position of provisionally set frame (indicator of position to be selected next): frame 37a is not displayed, and point 37b is displayed in a black color and in a blinking manner (steps S610, S611, S614, S615, S618, S619, S622, and S623)

Other selection frames: frame 37a is not displayed, and point 37b is continuously displayed in a black color (step S624)

Note that this is a merely an example, and other display forms can be adopted as well.

Note that, while the AF frame selection processing is under execution, the selection frame corresponding to the currently set AF frame may be displayed in a discriminative manner, separate from the provisionally set frame. In this case, the selection frame is displayed in a display form (frame 37a is displayed in a black color, for example) that is different from that of the provisionally set frame.

In step S630, the system control unit 50 determines whether or not a determination instruction has been received, and advances the processing to step S631 if it is determined that the determination instruction has been received, and returns the processing to step S625 if not. The determination instruction may be pressing (turning of) of the SET button 75 or turning on of the first shutter switch 62.

In step S631, the system control unit 50 sets the provisionally set frame as the new AF frame, and ends the processing.

Note that, here, if it is determined that the position resulting from the movement by the unit movement amount in the upward, downward, leftward, and rightward directions cannot be selected in steps S609, S613, S617, and S621, respectively, the display form at the position that is at the end in the direction is changed as the candidate of the moved position. However, the candidate of the moved position may be determined assuming that the uppermost row and the lowermost row are virtually continuous, and the rightmost column and the leftmost column are virtually continuous. For example, in the case where there are three settable positions to the end of the rightward direction, and the unit movement amount in the horizontal direction is four, although the right end position is determined as the candidate of the moved position in the above-described example, the left end position may be determined as the candidate of the moved position.

Figure 3:
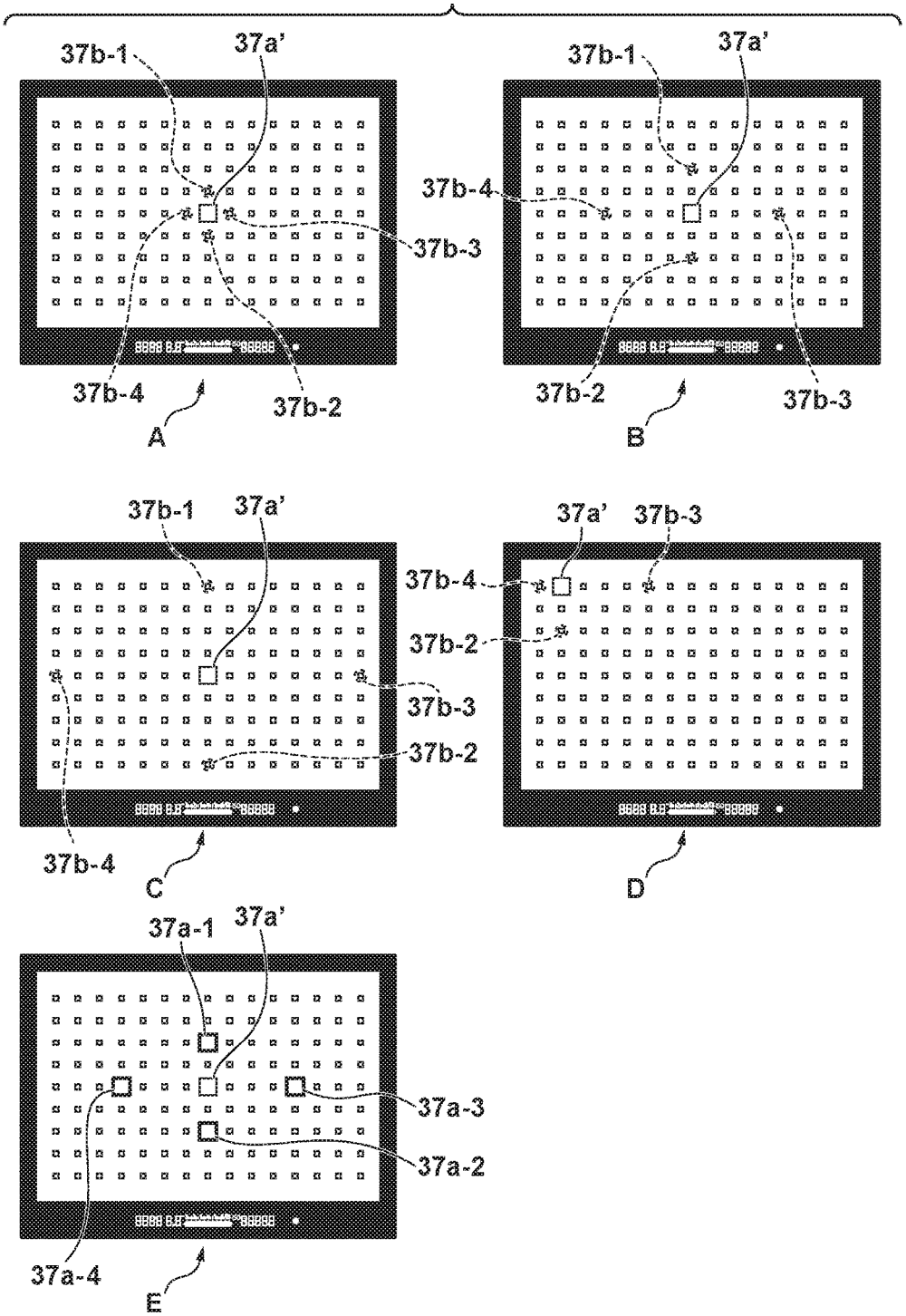
FIG. 3 is a diagram illustrating an exemplary viewfinder display of the digital camera according to the embodiment.

An exemplary display of the in-viewfinder display unit 53 while the above-described AF frame selection processing is under execution is shown in FIG. 3. In FIG. 3, A to C respectively show exemplary displays in the cases of Levels 1 to 3 with respect to the unit movement amount of the selection frame, when the processing in step S625 is executed.

With respect to the provisionally set frame, a frame 37a' is displayed, and the point 37b is not displayed. With respect to the selection frame indicating the candidates of the moved position, the frame 37a is not displayed and points 37b-1 to 37b-4 are displayed in a blinking manner.

In FIG. 3, A to C each shows an exemplary display in the case where the provisionally set frame can be moved by the unit movement amount in each of the upward, downward, leftward, and rightward directions. In contrast, D shows an exemplary display in the case where leftward and upward movements by the unit movement amount are not possible in a state of the unit movement amount being at Level 3. Also, E shows an example in which the unit movement amount is at Level 2, and the display form of the selection frames that indicate the candidates of the moved position is a continuous black color display of the frame 37a instead of a blinking black color display of the point 37b. Each of the selection frames that indicate candidates of the moved position indicates the position to which the provisionally set frame can be moved by one predetermined operation indicating the corresponding direction. In this way, the display form of the selection frame that indicates a candidate is not limited to blinking, and may be displayed by a frame. Also, the display color, the line thickness, and the brightness of the selection frame may be changed so as to be distinguishable from other positions. Also, the display for indicating the current At position needs only be distinguishable from the display for indicating a candidate.

The processing for changing the unit movement amount in step S626 will be described using the flowchart in FIG. 7. The operations illustrated in the flowchart in FIG. 7 are realized by the system control unit 50 deploying programs, which are stored in the nonvolatile memory 56, in the system memory 52 and executing the programs to control the units of the digital camera 100.

In step S701, the system control unit 50 determines whether or not the (current) unit movement amount before change is at Level 3, advances the processing to step S702 if it is determined to be at Level 3, changes the level of the unit movement amount to Level 1, and ends the processing. On the other hand, if it is not determined that the unit movement amount before change is at Level 3, the system control unit 50 advances the processing to step S703.

In step S703, the system control unit 50 determines whether or not the (current) unit movement amount before change is at Level 1, advances the processing to step S704 if it is determined to be at Level 1, changes the level of the unit movement amount to Level 2, and ends the processing. On the other hand, if it is not determined that the unit movement amount before change is at Level 1, the system control unit 50 advances the processing to step S705. The case where the processing in step S705 can be executed is a case where the (current) unit movement amount before change is at Level 2, and therefore the system control unit 50 changes the level of the unit movement amount to Level 3, and ends the processing.

In the present embodiment, as described above, on a display screen in which a position separated from the current position by a predetermined movement amount can be selected with a predetermined operation, the predetermined movement amount is made variable, and an indicator indicating the position to be selected with the next predetermined operation is displayed. Therefore, a user can be aware of the positions that can be selected with the next operation and the current movement amount. Also, by adjusting the movement amount according to the relationship between the current position and the position that the user desires to select, the user can effectively select the desired position.

Second Embodiment

Next a second embodiment of the present invention will be described with reference to the drawings. In the first embodiment, a configuration has been adopted in which the unit movement amount is unidirectionally changed according to operation made on the switching button 79. In the present embodiment, the direction in which the unit movement amount changes is switched according to which of the enlargement button 77 and the reduction button 78 is operated.

The present embodiment may be in common with the first embodiment other than the unit movement amount change processing. Therefore, in the following, the unit movement amount change processing in the present embodiment will be described with reference to the flowchart in FIG. 8. The operations illustrated in the flowchart in FIG. 8 are realized by the system control unit 50 deploying programs stored in the nonvolatile memory 56 in the system memory 52 and executing the programs to control the units of the digital camera 100.

In step S801, the system control unit 50 determines whether or not the (current) unit movement amount before change is at Level 3, advances the processing to step S802 if it is determined that the unit movement amount before change is at Level 3, and advances the processing to step S804 if not.

Figure 6D:
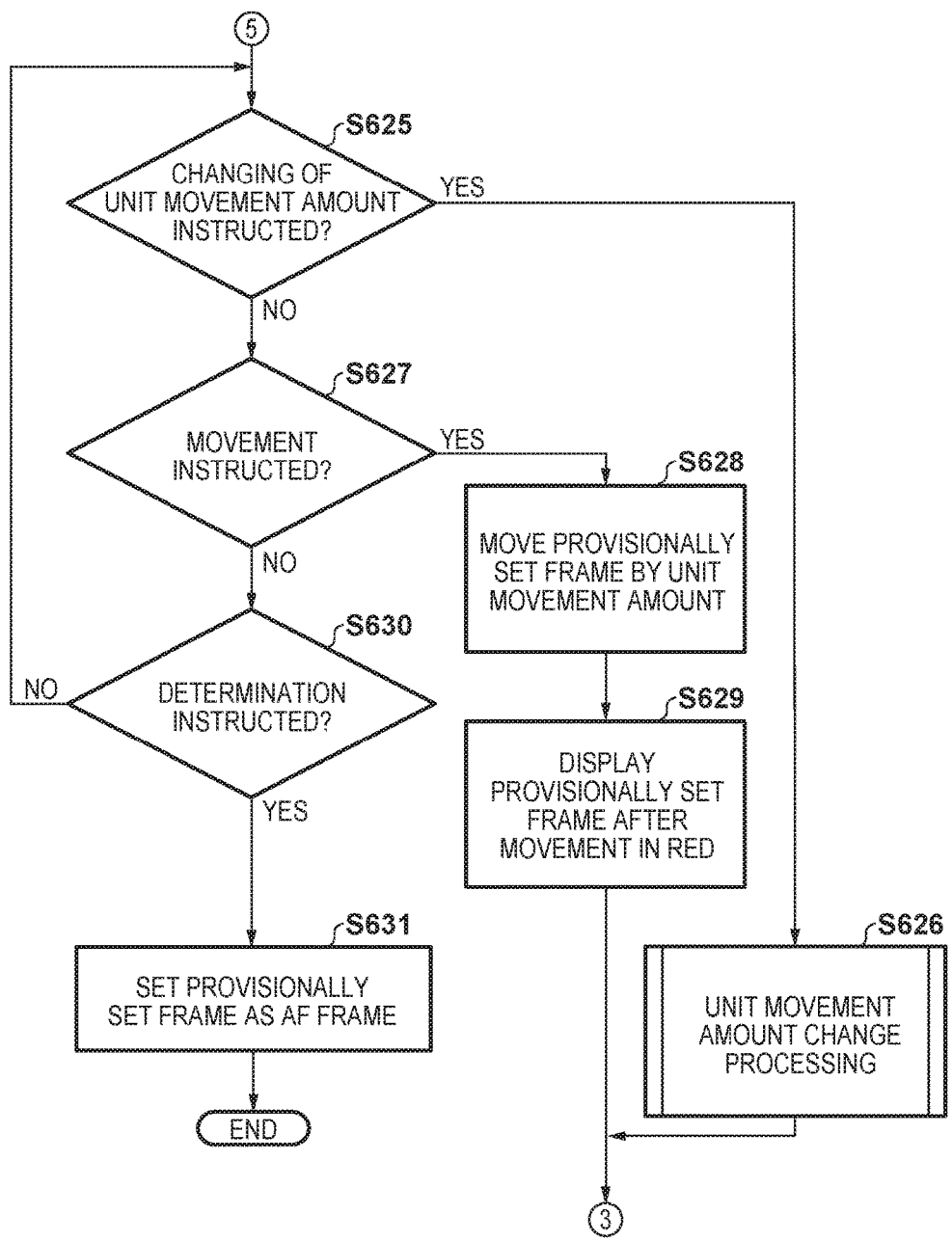
Figure 7:
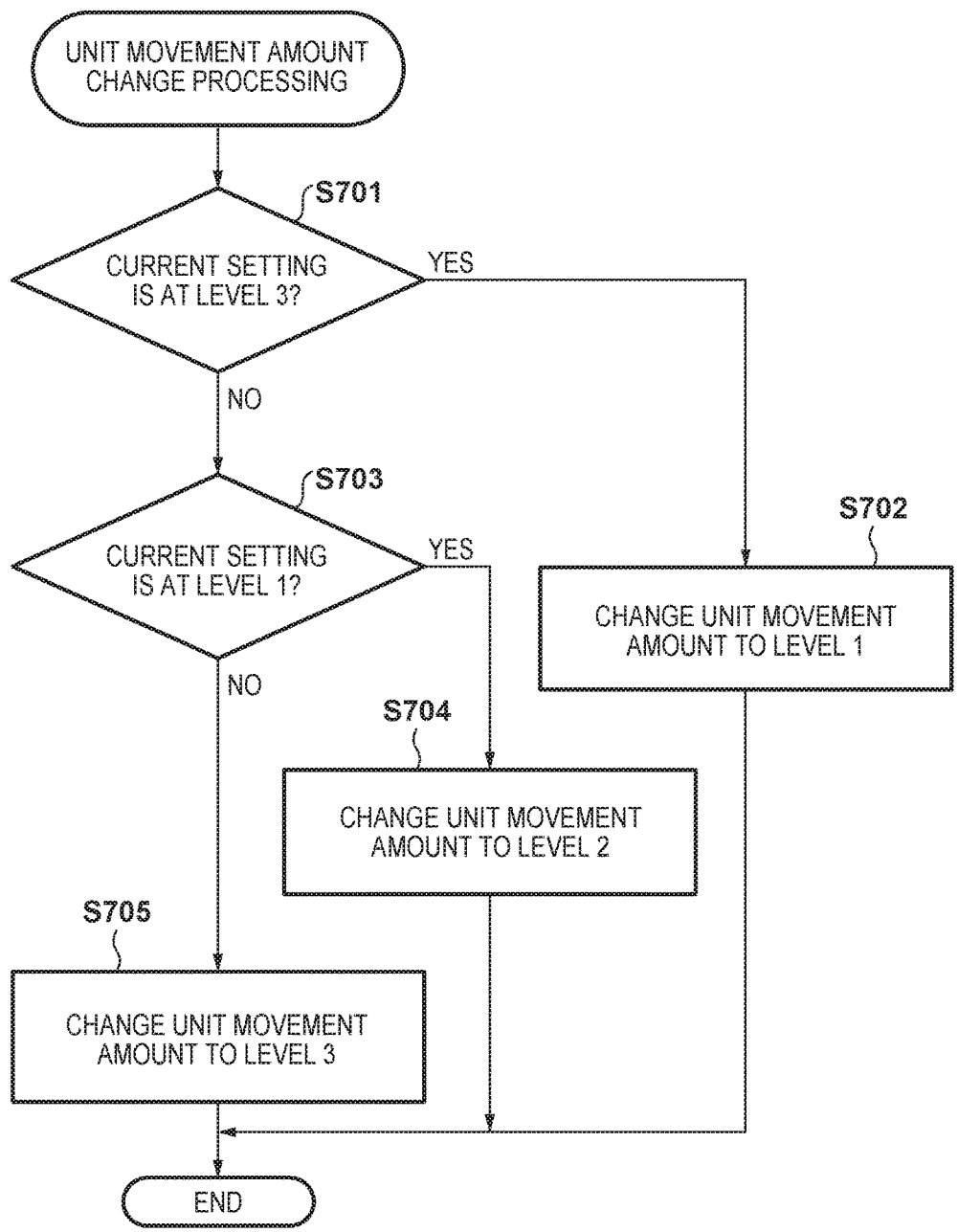
FIG. 7 is a flowchart relating to unit movement amount change processing of the digital camera according to the embodiment.

In step S802, the system control unit 50 determines whether or not the instruction to change the unit movement amount that has been detected in step S625 in FIG. 6D is an operation (turning on) of the enlargement button 77, advances the processing to step S803 if it is determined to be the operation of the enlargement button 77, changes the level of the unit movement amount to Level 1, and ends the processing. On the other hand, if it is not determined that the instruction to change the unit movement amount is an operation made on the enlargement button 77 (or, if it is determined to be an operation made on the reduction button 78), the system control unit 50 advances the processing to step S806, changes the level of the unit movement amount to Level 2, and ends the processing.

In step S804, the system control unit 50 determines whether or not the (current) unit movement amount before change is at Level 1, advances the processing to step S805 if it is determined that the unit movement amount before change is at Level 1, and advances the processing to step S807 if not.

In step S805, the system control unit 50 determines whether or not the instruction to change the unit movement amount that has been detected in step S625 in FIG. 6D is an operation (turning on) of the enlargement button 77, advances the processing to step S806 if it is determined to be the operation of the enlargement button 77, changes the level of the unit movement amount to Level 2, and ends the processing. On the other hand, if it is not determined that the instruction to change the unit movement amount is an operation made on the enlargement button 77 (or, if it is determined to be an operation made on the reduction button 78), the system control unit 50 advances the processing to step S808, changes the level of the unit movement amount to Level 3, and ends the processing.

The case where the processing step S807 can be executed is a case where the (current) unit movement amount before change is at Level 2. In step S807, the system control unit 50 determines whether or not the instruction to change the unit movement amount that has been detected in step S625 in FIG. 6D is an operation (turning on) of the enlargement button 77, advances the processing to step S808 if it is determined to be the operation of the enlargement button 77, changes the level of the unit movement amount to Level 3, and ends the processing. On the other hand, if it is not determined that the instruction to change the unit movement amount is an operation made on the enlargement button 77 (or, if it is determined to be an operation made on the reduction button 78), the system control unit 50 advances the processing to step S809, changes the level of the unit movement amount to Level 1, and ends the processing.

In this way, in the present embodiment, the unit movement amount is changed such that the level is moved up if the instruction to change the unit movement amount is an operation made on the enlargement button 77, and the level is moved down if it is an operation made on the reduction button 78. Also, if the enlargement button 77 is operated when the maximum level is set, the level is changed to the minimum level, and if the reduction button 78 is operated when the minimum level is set, the level is changed to the maximum level.

In the present embodiment, since a user can specify the direction in which the unit movement amount can be changed (increasing direction or decreasing direction), the usability can be improved compared with the configuration in which the unit movement amount can only be unidirectionally changed. Specifically, a significant effect can be obtained when the number of settable levels is large.

Note that, here, a configuration in which the direction in which the unit movement amount can be changed is specified by separate operation members (enlargement button 77 and reduction button 78) has been described. However, a rotation direction of a rotation member such as a dial may be associated with the change direction. Also, a pressing position (telephoto-side, wide-angle side) of a seesaw type operation member such as a powered zoom switch may be associated with the change direction. That is, operations of any one or plurality of members that can accept two types of inputs can be respectively associated with the directions in which the unit movement amount can be changed.

Other Embodiments

In the above-described embodiments, the display control performed in the in-viewfinder display unit provided in an optical viewfinder has been described. However, a configuration in which the display of the selection frame is displayed, in a superimposed manner, on a captured image (live view image) that is displayed in the electronic viewfinder, and a configuration in which the selection frame is displayed in a display unit inside the viewfinder along with a captured image may be adopted.

Also, the selection frame may not be displayed, in a superimposed manner, on a viewfinder optical image or a live view image. For example, in the case where a screen for setting the AF frame is called from a menu screen, the system control unit 50 may display the selection frame in the display unit 28 in a selectable manner without displaying a live view image.

Note that the present invention is not limited to the configurations of the exemplary embodiments described above, and modifications can be performed as appropriate in a scope specified in the appended claims. Also, the above-described various types of operations that have been described as being performed by the system control circuit may be performed by one piece of hardware, or by a plurality of pieces of hardware sharing the operations.

Also, the above-described embodiments relate to a case where the present invention has been applied to the screen display for selecting a focus detection region in an image capture apparatus. However, the present invention can be applied to any screen display for selecting one of a plurality of movable positions. That is, the present invention can be applied to any electronic device that includes a display apparatus, an input apparatus, and a control apparatus. These electronic devices include a personal computer, a PDA, a mobile telephone, a smartphone, an image viewer, a printer, a digital photo frame, a media player, a game console, an e-book reader, a tablet terminal, a projector, a consumer appliance, an in-vehicle apparatus, and the like. Note that, these are merely examples, and the present invention can be applied to other electronic devices as well.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-097512, filed May 16, 2017, which is hereby incorporated by reference herein in its entirety.

What is claimed is:

1. A display control apparatus comprising:
   a display control unit configured to perform control to display an indicator that indicates a position selected according to a selection operation performed by a user, from among a plurality of positions that are displayed on a display screen;
   a setting unit configured to set, as a movement amount of a selection candidate that can be selected from among the plurality of positions according to a selection operation performed by the user, at least a first movement amount or a second movement amount; and
   a control unit configured to perform control so as to,
   in a case of the first movement amount being set, display a position of a selection candidate that can be selected, from a position at which the indicator is displayed, according to a selection operation performed by the user, in a first display form so as to be distinguishable from other positions, and
   in a case of the second movement amount being set, display a position of a selection candidate that can be selected, from the position at which the indicator is displayed, according to a selection operation performed by the user, in the first display form so as to be distinguishable from other positions.

2. The display control apparatus according to claim 1, wherein a selection candidate can be selected according to a selection operation performed by the user is different between that in a case of the first movement amount being set and that in a case of the second movement amount being set.

3. The display control apparatus according to claim 1, wherein the control unit performs control such that the indicator is displayed at a position of the selection candidate displayed in the first display form, according to a selection operation being performed by the user.

4. The display control apparatus according to claim 1, further comprising a switching unit configured to switch between the first movement amount and the second movement amount as the movement amount to be set by the setting unit.

5. The display control apparatus according to claim 1, wherein the other positions are visibly displayed on the display screen.

6. The display control apparatus according to claim 1, wherein the plurality of positions displayed on the display screen are each a position at which a focus detection region can be set.

7. The display control apparatus according to claim 6, wherein the position at which the indicator is displayed is a position of the currently set focus detection region.

8. The display control apparatus according to claim 1, wherein the number of selection candidates that can be selected according to a selection operation performed by the user is different between when the first movement amount is set and when the second movement amount is set.

9. The display control apparatus according to claim 1, wherein, in a case where, relative to a movement amount from the position at which the indicator is displayed to a position of the selection candidate that is moved in a first direction according to a selection operation performed by the user, length from the position at which the indicator is displayed to the position that is located at an end in the first direction, from among the plurality of positions, is shorter, the control unit performs control such that the position at the end is displayed in the first display form.

10. The display control apparatus according to claim 1, wherein the control unit performs control such that the display in the first display form is performed by displaying the position of a selection candidate can be selected according to a selection operation performed by the user in either a blinking manner or a manner in which the display color is different from the other positions.

11. The display control apparatus according to claim 1, wherein the control unit performs control such that the indicator and a position of the selection candidate can be selected according to a selection operation performed by the user are distinguishably displayed.

12. The display control apparatus according to claim 1, wherein the display control apparatus is an image capture apparatus.

13. The display control apparatus according to claim 1, wherein the display screen is a display screen that is visible through a viewfinder.

14. The display control apparatus according to claim 1, wherein the selection operation performed by the user is for issuing an instruction to move a position to be selected in one of a plurality of directions including a first direction and a second direction, and there are a plurality of selection candidates that are to be displayed in the first display form.

15. The display control apparatus according to claim 14, wherein the plurality of directions are upward, downward, leftward, and rightward directions.

16. The display control apparatus according to claim 15, wherein the control unit performs control such that positions of the selection candidates that are respectively located in upward, downward, leftward, and rightward directions from the indicator are displayed in the first display form.

17. A control method of a display control apparatus that includes: display control means for performing control to display an indicator that indicates a position selected according to a selection operation performed by a user, from among a plurality of positions that are displayed on a display screen; and setting means for setting, as a movement amount of a selection candidate that can be selected from among the plurality of positions according to a selection operation performed by the user, at least setting a first movement amount or a second movement amount, wherein the control method comprises:

in a case of the first movement amount being set, displaying, by the display control means, a position of a selection candidate that can be selected, from a position at which the indicator is displayed, according to a selection operation performed by the user, in a first display form so as to be distinguishable from other positions, and in a case of the second movement amount being set, displaying, by the display control means, a position of a selection candidate that can be selected, from the positions at which the indicator being displayed, according to a selection operation performed by the user, in the first display form so as to be distinguishable from other positions.

18. A non-transitory computer-readable storage medium storing a program for causing a computer to function as a display control apparatus comprising: a display control unit configured to perform control to display an indicator that indicates a position selected according to a selection operation performed by a user, from among a plurality of positions that are displayed on a display screen;

a setting unit configured to set, as a movement amount of a selection candidate that can be selected from among the plurality of positions according to a selection operation performed by the user, at least a first movement amount or a second movement amount; and a control unit configured to perform control so as to, in a case of the first movement amount being set, display a position of a selection candidate that can be selected, from a position at which the indicator is displayed, according to a selection operation performed by the user, in a first display form so as to be distinguishable from other positions, and in a case of the second movement amount being set, display a position of a selection candidate that can be selected, from the position at which the indicator is displayed, according to a selection operation performed by the user, in the first display form so as to be distinguishable from other positions.

* * * * *